United States Patent [19]

Barry

[11] 4,125,835
[45] Nov. 14, 1978

[54] RANGE OR TIME-DELAY DETERMINING SUBSYSTEM FOR USE IN CERTAIN RADAR-LIKE SYSTEMS

[75] Inventor: John N. Barry, Kanata, Canada

[73] Assignee: Her Majesty the Queen in right of Canada, as represented by the Minister of National Defence, Canada

[21] Appl. No.: 834,565

[22] Filed: Sep. 19, 1977

[51] Int. Cl.² ............................ G01S 9/06; G01S 9/02
[52] U.S. Cl. ............................... 343/13 R; 340/1 C; 343/7.3; 356/5
[58] Field of Search ............... 356/5; 343/13 R, 7.5, 343/7.3; 340/1 C

[56] References Cited

U.S. PATENT DOCUMENTS

| | | | |
|---|---|---|---|
| 3,305,862 | 2/1967 | Samuel et al. | 343/13 R |
| 3,309,703 | 3/1967 | Ammon et al. | 343/13 R |
| 3,503,680 | 3/1970 | Schenkerman | 356/5 |
| 3,516,051 | 6/1970 | Arberman et al. | 340/1 C |
| 3,630,616 | 12/1971 | Everest | 356/4 |
| 3,723,002 | 3/1973 | Everest et al. | 356/5 |
| 3,947,119 | 3/1976 | Bamberg et al. | 356/5 |

FOREIGN PATENT DOCUMENTS 469,864  12/1950  Canada .................................. 343/13 R

*Primary Examiner*—S. C. Buczinski
*Attorney, Agent, or Firm*—Stevens, Davis, Miller & Mosher

[57] ABSTRACT

Complicated range gate radar systems are known for determining distance to a target, the target sometimes being centered in the range gate which may have a predetermined width equivalent to a predetermined distance. For example, the range gate may extend from 10,000 to 11,000 yards. The present invention provides a new and simple system for determining range to a target. A series of pulses of energy capable of being reflected from a target is transmitted. Consecutive pulses in the series are spaced apart in time by a predetermined interval and echo-pulses from the target are listened for for a time after each of a plurality of the transmitted pulses. The listening time for consecutive transmitted pulses is varied in a substantially linear manner from substantially zero to a maximum time less than the predetermined interval between transmitted pulses. The transmitted pulses are counted from the beginning of the measurement interval. When an echo is received, counting is stopped and the number of pulses counted is proportional to the distance to the target.

9 Claims, 2 Drawing Figures

RANGE OR TIME-DELAY DETERMINING SUBSYSTEM FOR USE IN CERTAIN RADAR-LIKE SYSTEMS

BACKGROUND OF THE INVENTION

This invention relates to an echo-pulse ranging method and apparatus.

It is known in radar systems to determine the distance to a target from a transmitter by measuring the time it takes for a transmitted pulse to travel to the target and return as an echo. Complicated systems are also used involving range gates which search for targets in a limited range which may be varied. For example, the range gate may have a width equivalent to a distance of 1000 yards and the search range can be swept outwardly from the transmitter until a target is detected. In some systems, the target can then be centered in the range gate.

The present invention provides a simple system, not taught by any of the prior art of which applicant is aware, for determining the distance to a target.

SUMMARY OF THE INVENTION

According to the invention, there is provided an echo-pulse ranging method comprising transmitting a series of pulses of energy capable of being reflected from a target. Consecutive pulses in the series are spaced apart in time by a predetermined interval. Echo-pulses from the target are listened to for a time after each of a plurality of the transmitted pulses, the listening time for consecutive transmitted pulses being varied in a substantially linear manner from substantially zero to a maximum time less than the predetermined interval between transmitted pulses. The trasmitted pulses are counted from the beginning of the measurement interval. Upon receipt of an echo-pulse, counting is stopped and the number of transmitted pulses counted until the echo was received is proportional to the distance to the target.

The invention also comprises apparatus for carrying out the method described in the immediately preceding paragraph.

BRIEF DESCRIPTION OF THE DRAWINGS

The invention will now be described in greater detail in connection with the accompanying drawings in which.

DETAILED DESCRIPTION OF THE PREFERRED EMBODIMENT

Figure 1:
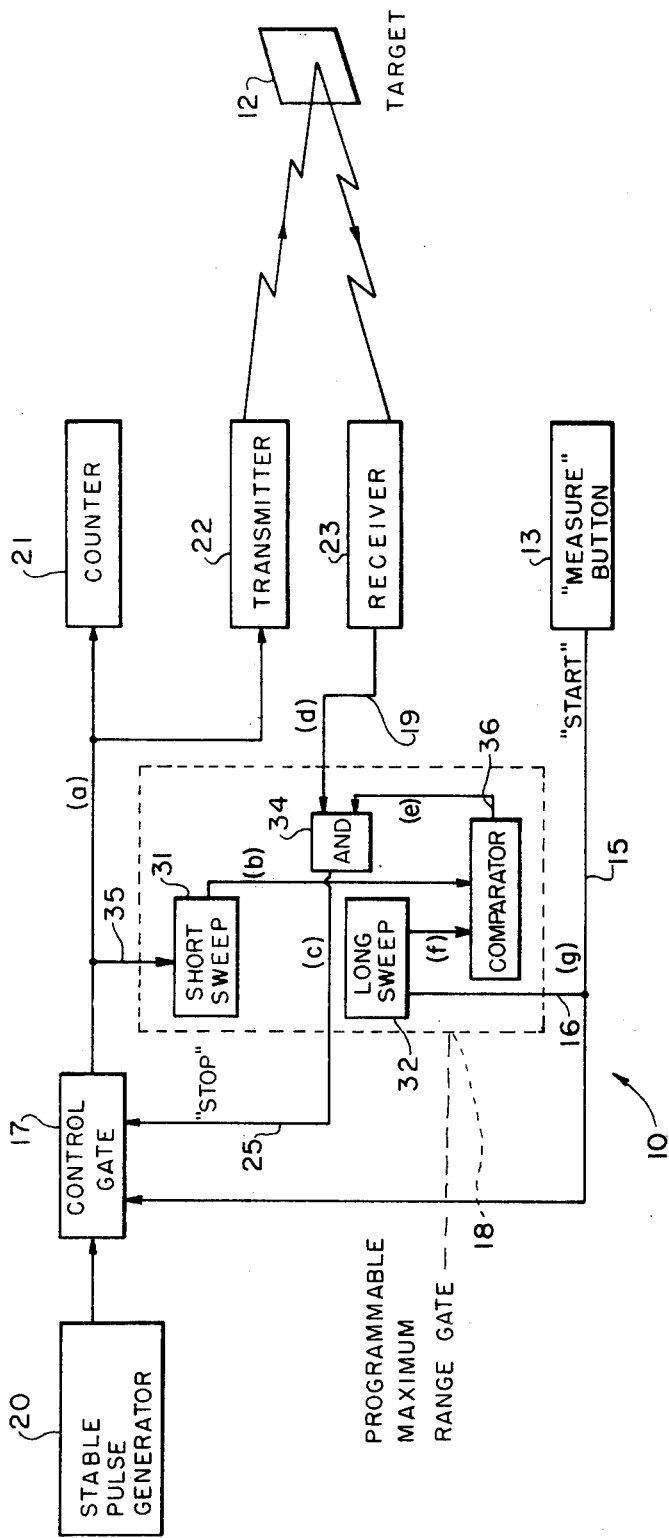
FIG. 1 is a block diagram of a preferred embodiment in accordance with the invention, and FIG. 2, parts (*a*) to (*g*) comprises a set of waveforms useful in explaining the operation of the embodiment of FIG. 1.

Referring to FIG. 1, there is shown an echo-pulse ranging aparatus according to the invention, generally indicated at 10, which is adapted to measure the distance to a target 12.

Figure 2:
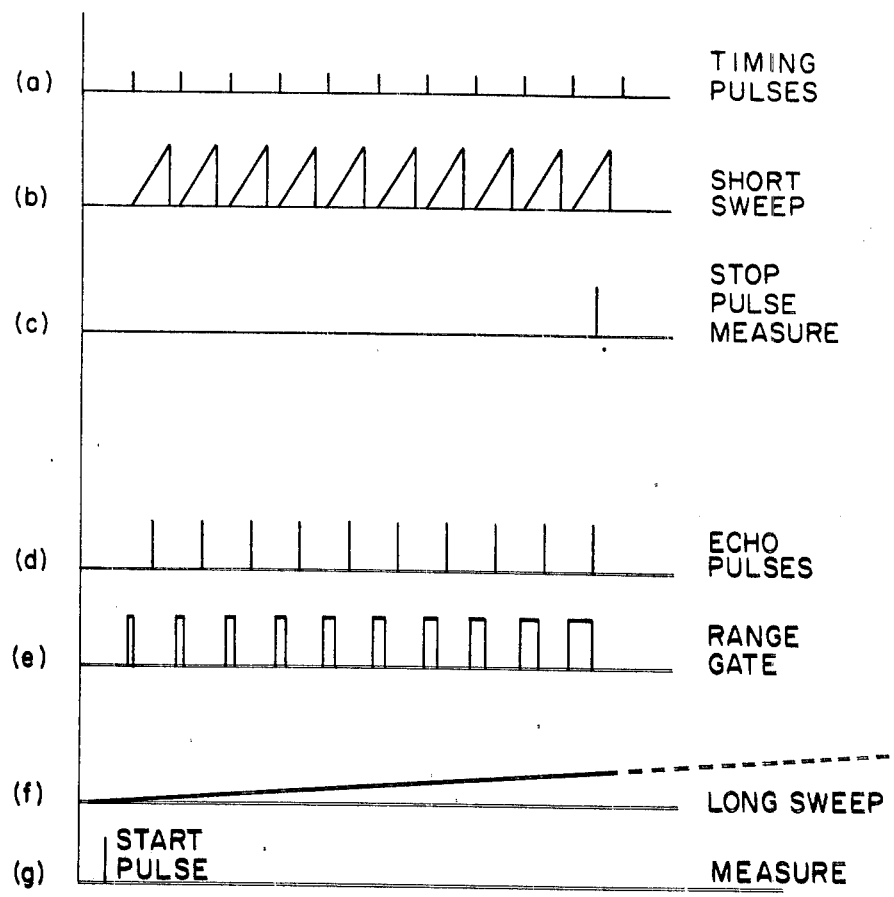

Pressing the "measure" button 13 causes a "start" signal shown at (*g*) in FIG. 2, to travel over lines 15 and 16 to the control gate 17 and the programmable maximum-range gate 18. The "start" signal to the control gate 17 enables it so that it then begins passing pulses from the stable pulse generator 20 to the counter 21 and transmitter 22. Each time the transmitter 22 receives a pulse from the stable pulse generator 20, it transmits a pulse which is radiated by suitable means such as an antenna, not shown, whereafter it strikes the target 12 and is reflected back to the receiver 23. Echo-pulses from receiver 23 are passed on line 19 to the programmable maximum-range gate 18 for processing. After receipt of the number of pulses corresponding to the range to the target the programmable maximum-range gate 18 emits a "stop" signal over line 25 to disenable the control gate 17. This stops any further pulses from being transmitted by the apparatus because pulses from the stable pulse generator 20 can no longer reach the transmitter 22. At the same time, this stops the counter 21 because it also no longer receives pulses from the stable pulse generator 20.

The programmable maximum-range gate 18 determines whether a pulse received by receiver 23 will stop the counter 21 and transmitter 22 by blocking control gate 17 and, briefly, operates as follows. Initially, the programmable maximum-range gate 18 is set to substantially zero delay thus blocking all delayed pulses which enter the receiver. At the same time, the counter 21 begins to total the main pulses, i.e. to count the number of transmitted pulses. The programmable maximum-range gate 18 then begins to relative slowly increase its delay from zero in either a smooth or step-wise manner up to a maximum time which is less than the time interval between transmitted pulses. Eventually, the delay of the programmable maximum-range gate 18 will be long enough to permit a reflected pulse detected by receiver 23 to fall within the range-gate interval. This will cause an output on line 25, which in turn will stop the apparatus. The reading on the counter 21 will be proportional to the distance to the target and, indeed, depending on the rate of change of delay provided by the programmable maximum-range gate 18, the reading on the counter may give directly the distance to the target in, for example, yards or meters. The calibration can be changed by simply adjusting the rate of change of the delay provided by the programmable maximum-range gate.

The start of the sweep in the programmable maximum-range gate 18 can be completely random with respect to the cycle of the main pulses with very little loss of accuracy, as only one pulse might be lost, i.e. not counted. Improvements in accuracy can be obtained by taking several readings and averaging. This can be accomplished conveniently by taking ten successive readings on a target, if the system is being used in a radar application, and letting the total in the counter accumulate to ten times the total for one reading. The measurement then has an additional significant number.

The manner by which the counter is to be started and stopped and the manner by which a linear rate of change of the maximum-delay gate is to be provided can be quite arbitrary. With modern solid-state components, the entire system of gates, counters, pulse generators and sweep generators can be provided at comparatively low expense with extremely high reliability.

The repetition rate of the stable pulse generator 20 may be several kilohertz. The programmable maximum-range gate may sweep linearly from substantially zero range to some convenient maximum, e.g. 10 kilometers range, which would be equivalent to an echo delay of approximately 60 micro-seconds.

The pulse repetition frequency of the stable pulse generator 20 and the sensitivity of the receiver 23 are such that no echo pulse following a specific main pulse overlaps the next main pulse.

The target may be a "co-operative" target which, while not necessary, can be used to achieve a vast increase in range.

Versions of the present invention could also be made utilizing schemes such as programmable gain in the receiver to overcome the effects of clutter close to the transmitter, and filtering and integration in the receiver to utilize the energy received in the echo-pulses preceding the echo-pulse that "trips" the programmable maximum-range gate 18.

While the invention has been discussed as applied to a "radar" system, other forms of radiant energy could be used following the principles of this invention, such as pulses of light from a laser. Since the measurement made is essentially a time-delay measurement, it is self-evident that the invention can also be used to measure a time-delay in a repetitive system without reference to distance.

The operation of the apparatus and particularly of the programmable maximum range gate 18 will now be discussed in more detail with parenthetical references to the waveforms (a), (b), (c), (d), (e), (f), of FIG. 2. These letters also appear in FIG. 1 to indicate where the waveforms appear in the apparatus.

Pressing the "measure" button 13 causes a "start" pulse (g) to be applied to control gate 17 and to the long sweep generator 32 which then produces a gradually increasing voltage (f). As control gate 17 is now enabled, timing pulses (a) from stable pulse generator 20 pass over line 35 to a short sweep generator 31 which produces a series of sweep pulses (b), there being one pulse (b) for each pulse (a). The short sweep pulses (b) and long sweep pulses (f) are compared in a comparator 33 which produces at its output 36 range gate pulses (e). The comparator 33 produces an output as long as the amplitude of the long sweep exceeds the amplitude of the short sweep. It will be noted that as the long sweep voltage (f) increases, the duration of the range-gate pulses (e) also increases. Thus a succession of longer range-gate pulses (e) is begun, under the control of the relatively long sweep (f). (For clarity, the long sweep (f) has been shortened drastically in FIG. 2, it being in actual practice several thousand times as long as the short sweeps (b).)

The range gate pulses (e) from comparator 33 are fed to one input of an AND gate 34. The other input of the AND gate 34 is fed echo-pulses (d) from receiver 23. Coincidence between pulses (d) and (e) results in AND gate 34 producing an output pulse (c) which stops the apparatus by blocking control gate 17.

It is to be understood that the short and long sweeps have the same maximum amplitude. In the jargon of the trade, the comparator output might be considered a "pick-off" on the short sweeps, under the control of the long sweep. The important point is that the "pick-off" be linear and, for ease of use, capable of calibration.

The embodiments of the invention in which an exclusive property or privilege is claimed are defined as follows:

1. An echo-pulse ranging method comprising transmitting a series of pulses of energy capable of being reflected from a target, consecutive pulses in said series being spaced apart in time by a predetermined interval $(T_o)$, listening for an echo-pulse from said target for a time after each of a plurality of said transmitted pulses, said listening time being varied in a substantially linear manner for consecutive transmitted pulses from substantially zero to a maximum times less than said predetermined interval, and counting the number of transmitted pulses from the beginning of the measurement interval until an echo is received, the number of transmitted pulses counted until said echo is received being proportional to the distance to said target.

2. An echo-pulse ranging apparatus comprising means for transmitting a series of pulses of energy capable of being reflected from a target, consecutive pulses in said series being spaced apart in time by a predetermined interval $(T_o)$, means for listening for an echo-pulse from said target for a time after each of a plurality of said transmitted pulses, including means for varying said listening time in a substantially linear manner for consecutive transmitted pulses from substantially zero to a maximum time less than said predetermined interval, and means for counting the number of transmitted pulses until an echo is received, the number of transmitted pulses from the beginning of the measurement interval counted until said echo is received being proportional to the distance to said target.

3. Apparatus as claimed in claim 2 wherein said means for transmitting a series of pulses comprises a transmitter controlled by a stable pulse generator.

4. Apparatus as claimed in claim 3 wherein said stable pulse generator feeds said transmitting means via one input of a control gate, said control gate having a second input which disenables it upon receipt of an echo pulse by said apparatus.

5. Apparatus as claimed in claim 4 comprising a receiver having an output which feeds an input of a programmable maximum-range gate, said programmable maximum-range gate having an output connected to said second input of said control gate, said programmable maximum-range gate comprising the means for varying said listening time.

6. Apparatus as claimed in claim 2, wherein said means for counting the number of said transmitted pulses comprises a counter connected to said stable pulse generator via said control gate.

7. Apparatus as claimed in claim 5 wherein said means for counting the number of transmitted pulses comprises a counter connected to said stable pulse generator via said control gate.

8. Apparatus as claimed in claim 2, and further comprising start means to enable said control gate and start said listening means.

9. Apparatus as claimed in claim 5, and further comprising start means to enable said control gate and start said programmable maximum range gate.

* * * * *